US009332284B1

(12) United States Patent
Taylor

(10) Patent No.: US 9,332,284 B1
(45) Date of Patent: May 3, 2016

(54) PERSONALIZED ADVERTISEMENT CONTENT

(71) Applicant: Amazon Technologies, Inc., Reno, NV (US)

(72) Inventor: Amber Autrey Taylor, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 13/780,251

(22) Filed: Feb. 28, 2013

(51) Int. Cl.
| H04N 7/10 | (2006.01) |
| H04N 7/025 | (2006.01) |
| H04N 21/234 | (2011.01) |
| H04N 21/488 | (2011.01) |
| H04N 21/442 | (2011.01) |
| H04N 21/478 | (2011.01) |
| H04N 21/258 | (2011.01) |
| H04N 21/81 | (2011.01) |
| H04N 21/254 | (2011.01) |

(52) U.S. Cl.
CPC ..... *H04N 21/23424* (2013.01); *H04N 21/2542* (2013.01); *H04N 21/25883* (2013.01); *H04N 21/44218* (2013.01); *H04N 21/47815* (2013.01); *H04N 21/488* (2013.01); *H04N 21/812* (2013.01)

(58) Field of Classification Search
CPC .................. H04N 21/25883; H04N 21/23424; H04N 21/44218; H04N 21/812; H04N 21/2542; H04N 21/47815
USPC ................................... 725/9–13, 32–36, 109
See application file for complete search history.

(56) References Cited

U.S. PATENT DOCUMENTS

| 7,363,643 | B2* | 4/2008 | Drake et al. ..................... 725/34 |
| 2002/0010759 | A1* | 1/2002 | Hitson ............... H04N 21/2543 709/219 |
| 2003/0028883 | A1* | 2/2003 | Billmaier ........... H04N 21/4182 725/46 |
| 2007/0198532 | A1* | 8/2007 | Krikorian et al. ............... 705/35 |
| 2008/0276269 | A1* | 11/2008 | Miller et al. ..................... 725/34 |
| 2010/0057560 | A1* | 3/2010 | Skudlark et al. ........... 705/14.49 |
| 2010/0211884 | A1* | 8/2010 | Kashyap et al. .............. 715/745 |
| 2010/0242063 | A1* | 9/2010 | Slaney et al. ................... 725/32 |
| 2011/0185384 | A1* | 7/2011 | Wang et al. ..................... 725/34 |
| 2012/0072936 | A1* | 3/2012 | Small et al. ..................... 725/10 |
| 2012/0169583 | A1* | 7/2012 | Rippel et al. .................. 345/156 |
| 2012/0272261 | A1* | 10/2012 | Reynolds et al. ............... 725/30 |

* cited by examiner

*Primary Examiner* — Jeremy Duffield
(74) *Attorney, Agent, or Firm* — Thomas | Horstemeyer, LLP

(57) ABSTRACT

Disclosed are various embodiments for selecting personalized advertisements to be transmitted to a user device during the streaming of advertisement-supported media item content. A primary user and a secondary user may be associated with the consumption of media item content being streaming to a user device. Based on the identification of both the primary user and secondary user, presence metadata may be generated. Using at least the presence metadata, advertisements that are appropriate for and target both the primary and any secondary users may be selected and transmitted to the client device.

21 Claims, 5 Drawing Sheets

PERSONALIZED ADVERTISEMENT CONTENT

BACKGROUND

Streaming media item content to a user device over a network connection is a popular approach for users to select and view preferred media item content at times convenient to the user. In some instances, the media item content may include advertisement support during the streaming of the media item content as a way to supplement or reduce any costs to the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
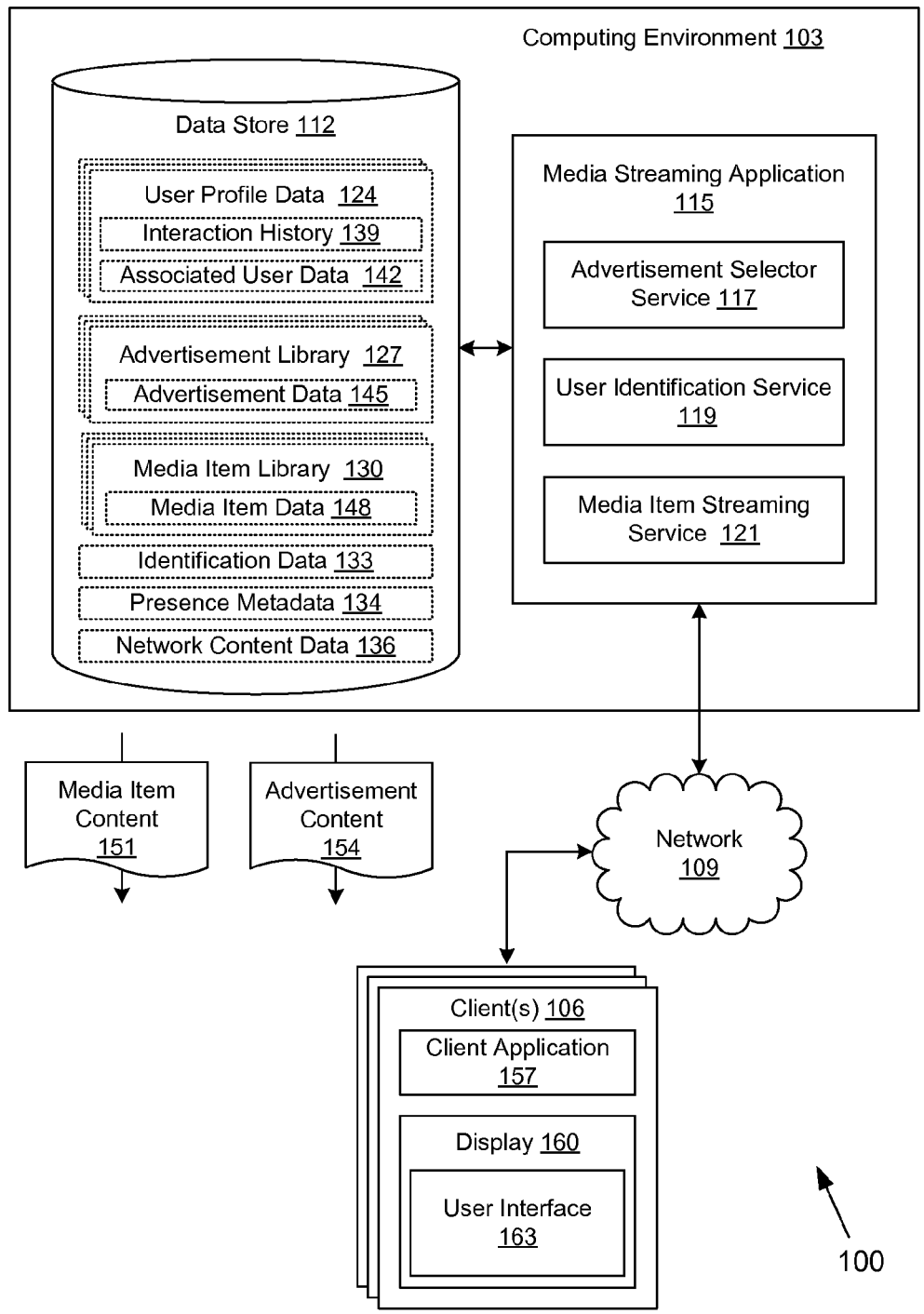
FIG. 1 is a drawing of a networked environment according to various embodiments of the present disclosure.

The present disclosure relates to selecting and providing personalized advertisement content to be presented to a primary user and any secondary users associated with the consumption of media item content being streamed to a user device. A primary user may be associated with a user account that is used when accessing and requesting the preferred media item content. The account information corresponding to the primary user may include information specific to the primary user that may be used for targeted advertising. However, the advertisements selected may only be related to the primary user and may not be appropriate for any secondary users also consuming the media item content with the primary user. By identifying all the users consuming the streaming media item content to a user device, the embodiments may select appropriate advertisement content for all users consuming the media item content at any given time rather than just the primary user.

In some embodiments, the primary user and any secondary users associated with the consumption of media item content may be identified by user login, user inputs, facial recognition algorithms applied to a received image, biometric algorithms based on received biometric inputs, RFID, or any other type of identification approach. Identification by user input may be based on user inputs received on a network page provided to the primary user. The primary user may provide login information that may be used to access a user profile corresponding to the primary user. Identification of any secondary users may also be based on user inputs that are used to identify the secondary users and/or identify characteristics or demographic qualities associated with any of the secondary users.

In some embodiments, if the client device includes a camera, identification of any of the users may be based at least upon facial recognition. By capturing an image of any users that are viewing the device, the embodiments may be able to apply a facial recognition algorithm to identify those users. In another non-limiting example, if the client device includes a microphone, identification of any of the users may be based at least upon signals captured by the microphone and processed through biometric algorithms. In some embodiments, the identification of the users may only identify particular demographic qualities about the users such as, for example, age and/or sex.

In other embodiments, presence metadata may be generated based at least in part on the identification of the users that are presently consuming the media item content being streamed to a client device. The presence metadata may include data such as, for example, demographic data corresponding to primary user and/or any identified secondary users, interaction history associated with the primary user and/or any identified secondary users, and/or any other data that may be used to select advertisement content to transmit to the primary and any secondary users during the streaming of the media item content. In the following discussion, a general description of the system and its components is provided, followed by a discussion of the operation of the same.

With reference to FIG. 1, shown is a networked environment 100 according to various embodiments. The networked environment 100 includes a computing environment 103 and one or more clients 106 that are in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112 for example, is associated with the operation of the various applications and/or functional entities described below.

The components executed on the computing environment 103, for example, include a media streaming application 115 that includes an advertisement selector service 117, a user identification service 119, and a media item streaming service 121. In addition and other applications, services, processes, systems, engines, or functionality may be implemented on the computing environment 103 that is not discussed in detail herein. The media streaming application 115 is executed to facilitate the creation of a media item streaming event, streaming of a media item, interaction during a media item streaming event, and potentially other functions. The media streaming application 115 may also serve up network pages, such as web pages or other network content that is encoded for rendering on clients 106.

The advertisement selector service 117 is executed to select advertisements to transmit to the client device 106. The user identification service 119 is executed to identify at least one user in association with the consumption of the media item content 151. The media item streaming service 121 is executed to serve up or stream the media item content 151 to respective clients 106 to be rendered on the user interface 163.

The data stored in the data store 112 includes, for example, user profile data 124, an advertisement library 127, a media item library 130, identification data 133, presence metadata 134, network content data 136 and potentially other data. The user profile data 124 may include profile data relating to the user. The user profile data 124 may include interaction history 139, associated user data 142, demographics, and/or other information. The interaction history 139 may include lifestyle and in-market information such as, for example, a viewing history, purchase history, comment history, advertisement selection history, and/or other information corresponding to interactions with at least the media streaming application 115, an electronic commerce application and/or other applications that may access and/or update the user profile data 124. Associated user data 142 may include information about other users that may be associated with the user. For example, assume the user has a daughter. The associated user data 142 may include information about the daughter. The associated user data 142 may include a name of an associated user, demographic data, interaction history data, or other information about the associated user.

The advertisement library 127 may include the advertisements that may be transmitted to the client 106 along with the transmission of the media item content 151. The advertisement library 127 may include advertisement data 145 and/or other information. The advertisement data 145 may include the advertisement content 154, advertisement metadata and/or any other data related to the advertisements contained within the advertisement library 127.

The media item library 130 may comprise media item data 148. The media item data 148 comprises data that makes up a media item including media item content 151 such as movies, television shows, video clips, music, and/or other forms of media items. The identification data 133 may include data that the user identification service 119 may use for the identification of the users associated with the consumption of the media item content 151 on the client 106. The presence metadata 134 may comprise data associated with a primary user and/or any secondary users associated with the consumption of the media item content. The presence metadata 134 may further comprise data that is associated with items of interest associated with the primary and/or secondary users that may be determined based on an image captured by the client device 106.

Network content data 136 may include images, text, code, graphics, audio, video, and/or other content that may be served up by the media streaming application 115. To this end, network content data 136 may include static network content or static elements of network content, for example, in hypertext markup language (HTML), extensible markup language (XML), and/or any other language suitable for creating network content. Further network content data 136 may include code that generates dynamic network pages when executed or interpreted in the computing environment 103. Such code may be written in any suitable programming language, such as PHP, Perl, Objective C, Java, Ruby, etc. Network content data 136 may also include code configured to be executed or interpreted within a client 106 in order to render a dynamic network content. Such code may be referred to as applets and may be written in any suitable programming language, such as Java Script, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 157 and/or other applications. The client application 157 may be executed in a client 106, for example, to access network content served up by the computing environment 103 and/or other servers, thereby rendering a user interface 163 on the display 160. The client application 157 may comprise, for example, a browser, a mobile application, etc., and the user interface 163 may correspond to network content, a mobile application screen, etc. The client 106 may be configured to execute applications beyond the client application 157 such as, for example, email applications, social networking applications, productivity applications and/or other applications.

Next, a general description of the operation of the various components of the networked environment 100 is provided. To begin, a media streaming application 115 may facilitate the ability to request and stream media item content 151 over a network 109 to a client device for consumption by a primary user and potentially any secondary users. Based on the request, the media item streaming service 121 may begin streaming the media item content 151 to the client device 106. The media item content 151 requested may also have advertisement support so that at certain times during the streaming of the media item content 151, advertisement content 154 may be transmitted to the client device 106. When deemed appropriate for an advertisement to be transmitted during the streaming of the media item content 151, the advertisement selector service 117 may select appropriate advertisement content 154 to transmit to the client device 106. The advertisement content 154 may be selected based at least in part upon any identified users that are associated with the consumption of the media item content 151.

In some embodiments, the media streaming application 115 via the user identification service 119 may identify the users associated with the consumption of the requested media item content 151. Although in some instances a primary user may be the only user consuming the media item content 151, in other instances the primary user may be joined by at least one secondary user during the consumption of the media item content 151. For example, a father may request to stream a particular television show to his tablet device. However, the father may watch the streaming television show with his children. Therefore, the media streaming application 115 via the user identification service 119 may not only identify the father requesting the media item content 151, but also identify his children.

The identification of the primary user and any possible secondary users associated with the consumption of the media item content 151 may be based at least in part on any of the following: user login, user inputs, facial recognition algorithms applied to a received image, biometric algorithms based on received biometric inputs, RFID, or any other type of identification approach.

In one non-limiting example, the identification of the primary user may be based upon a user login. The user identification service 119 may use the received user login inputs to determine the appropriate user profile data 124 associated with the primary user. In another non-limiting example, the identification of the secondary user(s) may be based upon user inputs. The user inputs may be based on check-boxes, radio buttons, text entry forms and/or other components that may be selected or receive inputs used to identify the secondary user(s). For example, the user profile data 124 may contain associated user data 142 that identifies other users that are associated with the primary user.

Upon the identification of the primary user, a user interface 163 in form of a network page or other network content served up by the media streaming application 115 may include check-boxes and/or other components that correspond to each user associated with the associated user data 142. A user may select the appropriate associated user(s) to identify as any of the secondary users also consuming the media item content 151 with the primary user. For example, assume that user 1 is the identified primary user. When requesting media item content 151 to stream to a client device 106, network content served up by the media streaming application 115 may provide a component that may be selected to determine whether any other users will be consuming the media item content 151. The user may be presented a selection of possible secondary users based on the associated user data 142 corresponding to the user profile data 124 associated with user 1. The selected user(s) will be identified as a secondary user(s) that will be consuming the media item content 151 along with the primary user.

In another non-limiting example, a user may enter information that may identify at least certain characteristics or demographic qualities that are associated with any secondary users. In one non-limiting example, a user may select a component on network content served up by the media streaming application 115 to confirm that there is at least one secondary user within a particular age range that will also consuming the media item content 151. For example, a father and his nine-year-old son plan to watch a particular advertisement-supported television show on a tablet device. The father may be identified as the primary user. His user profile data 124 may be used to identify or determine particular characteristics, interests, interaction history 139, demographic data, and/or any other information that may be associated with the father. In addition, the father may be able to select a component(s) on network content served up by the media streaming application 115 to input that a secondary user within the age range of eight to ten years old will also be consuming the media item content 151.

In another non-limiting example, if the identification is based on facial recognition algorithms, the user identification service 119 may request a camera included on the client device 106 to capture an image of the user(s) consuming the media item content 151. After receiving the captured image from the client device 106, the user identification service 119 may apply various facial recognition algorithms included in the identification data 133 to determine the user(s) currently consuming the media item content 151 on the client device 106. The user identification service 119 may also be able to determine any secondary users are also consuming the media item content 151 along with the primary user.

In another non-limiting example, the user identification service 119 may apply recognition algorithms to identify items in the room or location that the primary user and possible secondary user(s) are consuming the media item content 151. For example, the camera may be able to detect an image of a particular brand name beverage (e.g. COKE®) in the location where the media item content 151 is being consumed. The identification of this item may be used in selecting advertisements to be presented to the users.

In another non-limiting example, the identification may be based on biometric data. The biometric data may include, for example, voice(s), hand print(s), finger print(s), behavior, or other type of identifying biometric. For example, the client device 106 may be able to receive a vocal command through a microphone device included on the client device 106. The microphone device may receive the audio signals from the voice command and apply to biometric voice recognition algorithms to appropriately identify the subject entity currently using the client device. The microphone device may also receive audio signals from the location where the user(s) consumes the media item content 151 that are not necessarily a voice command. For example, if a parent is consuming media item content 151 with a young child and the young child makes a sound, the microphone device may received the audio signal of the sound and determine that a secondary user consuming the media item content 151 is that of a young child based on pitch or frequency content of the recorded audio.

In some embodiments, the media streaming application 115 via the advertisement selector service 117 may generate presence metadata 134 based at least in part upon the identification of the primary user and/or any possible secondary users. The presence metadata 134 determined may be based at least in part upon demographic data corresponding to the primary user and/or any identified secondary users, interaction history 139 associated with the primary user and/or any identified secondary users, data related to items observed in the location of the client device 106, and/or any other data associated with the primary user and/or any secondary users.

For example, assume user 1, user 2, and user 3 are all consuming media item content 151 on a client device, and user 1 is identified as the primary user while user 2 and user 3 are both identified as secondary users. Assume user 1 is a thirty-year old female who is known, based at least in part on the user profile data 124 to have an interest in cooking shows, reality television, kid-themed projects, and current fashion. Further assume, that user 2 is identified as being a male in the age-range of four to six years old, and user 3 is identified as being a female in the age-range of seven to nine years old. In one non-limiting example, the presence metadata 134 may be a compilation of all the data associated with all of the users. In another non-limiting example, the presence metadata 134 may be based only on the user 2 and user 3. In another non-limiting example, the presence metadata 134 may be determined based at least upon a selection of data that is associated with user 1, user 2, and user 3. For example, the presence metadata 134 may include the interests of user 1 relating to art-supplies and cooking shows, but may not include data relating to reality television and/or current fashion since those topics may not be appropriate for children in the age range as user 2 and user 3. In another non-limiting example, the presence metadata 134 may include data noting a possible parent-child and/or other information that may be determined about the users that currently consuming the media item content 151.

In another embodiment, the advertisement selector service 117 may select an advertisement from the advertisement library 127 that may be appropriate to transmit to the client device based at least in part upon the determined presence metadata 134. The advertisement library 127 may include multiple advertisements that the advertisement selector service 117 may select to present to the primary user and if applicable, any secondary users. The advertisement data 145 may include advertisement metadata corresponding to each advertisement included in the advertisement library 127 that includes information about the advertisement. By comparing the presence metadata 134 with the advertisement metadata, the advertisement selector service 117 may be able to select appropriate advertisement content 154 to transmit to the client device 106.

In one non-limiting example, the advertisement selector service 117 may select advertisement content 154 based at least in part upon matching of particular demographic data between the presence metadata 134 and the advertisement metadata. For example, if the presence metadata 134 states that the users are within an age range of two to forty years old, than advertisement content 154 may be selected if corresponding advertising metadata states that the advertisement content 154 is appropriate for users aged two years old. In another example, assume that a mother and child are consuming media item content 151 on a client device 106. The presence metadata 134 may include that the relationship is a mother child relationship. The advertisement selector service 117 may select advertisements that are not only appropriate for the age of the child but also show a mother with her child. This information about the advertisement content 154 may be within the advertisement metadata.

In another non-limiting example, if there are multiple advertisements within the advertisement library 127, the advertisement selector service 117 may assign a score to each of the advertisements based on the comparison of the presence metadata 134 and the advertisement metadata. For example, one advertisement may be appropriate for a younger age range but the advertisement is for type of boy product. Assume another advertisement is also appropriate for a younger age, but it relates to a type of girl product. If the secondary user is a young girl, the advertisement selector service 117 may assign a higher score to the advertisement relating to a girl product than the advertisement relating to a boy product. As such, the advertisement selector service 117 may select the advertisement with the higher score.

In another non-limiting example, the advertisement selector service 117 may select an advertisement based at least in part upon an interaction history 139 that shows prior interest in a particular item. For example, assume a user expressed an interest in a particular product previously advertised by selecting a link included on the advertisement. If such an interest is detected, the advertisement selector service 117 may select another advertisement associated with the same product. In some embodiments, the selected advertisement may include additional incentives relating to the purchase of the product. In another non-limiting example, the advertisement selector service 117 may selected an advertisement based at least in part upon an item detected from a captured image in the location that the user(s) is consuming the media item content 151. For example, if a can of COKE® was detected in the location of the client device 106, it may be more appropriate to select an advertisement for COKE® rather than an advertisement for a competitor such as, for example, PEPSI®. Additionally, if secondary users are identified as young children, the advertisement selector service 117 may select an advertisement for a COKE® product that may be more appropriate for children such as, for example, SPRITE®.

In another non-limiting example, the advertisement selector service 117 may select an advertisement based at least in part upon the combination of presence metadata 134, advertisement metadata, and content metadata. The media item data 148 may include content metadata that contains information about specific media item content 151. For example, if the media item content 151 relates to criminals who rob banks, the content metadata may include data about criminals and/or robbing banks. Additionally, the advertising metadata may also include information about whether certain advertisements are appropriate to be shown along certain media item content 151. For example, a bank may not want to advertise during a television that has a bank robbery.

In one non-limiting example, the advertisement selector service 117 may first compare the content metadata with the advertisement metadata to limit the advertisements that may be transmitted to the user. Following the limitation of the advertisements, the advertisement selector service 117 may compare the presence metadata 134 with the advertisement metadata of the limited advertisements to select the appropriate advertisement content 154 to transmit to the client device 106.

In another embodiment, the media streaming application 115 via the media item streaming service 121 may transmit the selected advertisement content 154 to the client 106. In one non-limiting example, the media item streaming service 121 may transmit the selected advertisement content 154 at predefined intervals during the streaming of the media item content 151. For example, after every ten minutes of streaming the media item content 151, the media item streaming service 121 may pause the streaming of the media item content 151 and transmit the advertisement for a predefined period of time before resuming the streaming of the media item content 151. In another non-limiting example, the media item content 151 may contain advertisement pods, and/or other types of breaks in the media item content 151 that reflect an appropriate instance for an advertiser video or display. When the media item streaming service 121 detects an advertisement pod, the media item streaming service 121 may transmit the selected advertisement content 154 to the client device 106.

In another embodiment, the media streaming application 115 may detect interaction by any of the users consuming the media item content 151 with transmitted advertisement content 154. For example, the advertisement content 154 presented to the user(s) may include a link or other component that a user may select. Upon selection of the link and/or other component, the media streaming application 115 may serve up a network page that may include additional information about the product included in the advertisement. In one non-limiting example, the media streaming application 115 may facilitate the purchase of the product from the advertisement. In another non-limiting example, the media streaming application 115 may note the interaction and apply to the interaction history 139 in the user profile data 124 associated with the primary user.

In another embodiment, the media streaming application 115 may detect a change in the primary user and/or secondary user(s) that are currently consuming the media item content 151. As such, the user identification service 119 may re-identify the primary user and/or any possible secondary users currently consuming the media item content 151. For example, assume that the user identification service 119 originally identified both user 1 and user 2 as currently consuming the media item content 151. As such, the selection of the advertisements may be based at least in part upon user 1 and user 2. However, if the user identification service 119 detects that user 2 is no longer consuming the media item content 151, the embodiments may alter the selection of advertisements so that they are only targeted towards user 1 without the concern or acknowledgment of user 2. Upon re-identifying the primary user and, if applicable, the secondary user(s) currently consuming the media item content 151, the advertisement selector service 117 may generate and/or update the presence metadata 134. Therefore, if user 1 is an adult and user 2 is a young child, the advertisements selected upon the detection of the removal of user 2 may be those that were not necessarily appropriate for a young child but may be of interest to user 1.

Figure 2:
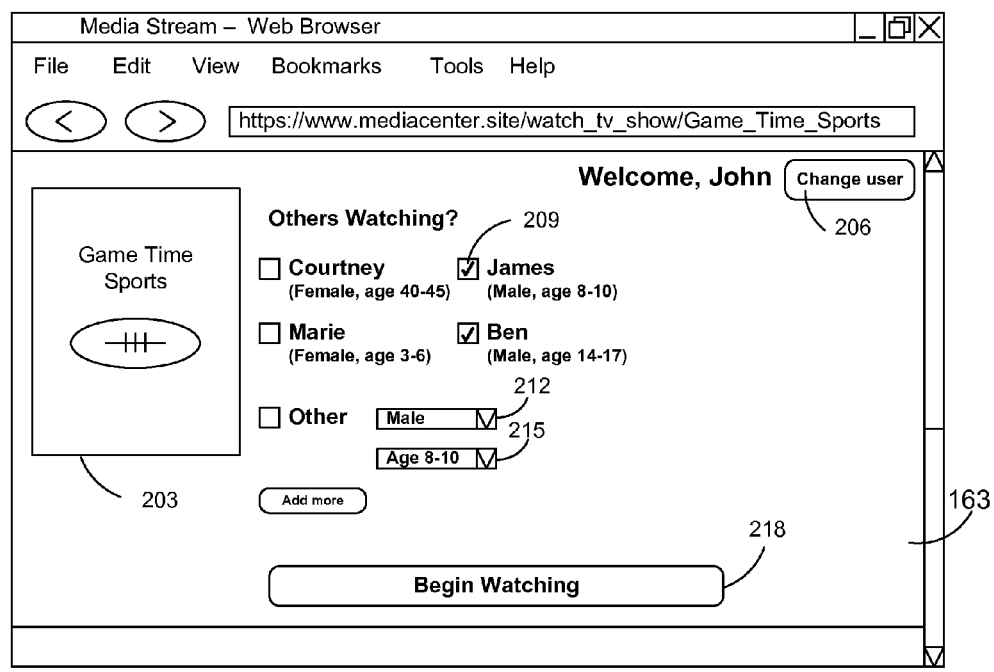
FIGS. 2-3 are drawings of examples of user interfaces rendered by a client in the networked environment of FIG. 1 according to various embodiments of the present disclosure.

Referring next to FIG. 2, shown is a drawing of an example of a user interface 163 (FIG. 1) rendered by a client 106 (FIG. 1) in the networked environment 100 (FIG. 1) according to various embodiments of the present disclosure. In particular, FIG. 2 depicts an example of stream media selection view 200 rendered by a client application 157 (FIG. 1) executing on the client 106.

The stream media selection view 200 may include an media item image 203, a change user control 206, an associated user check-box 209, a first select secondary user demographic drop-down box 212, a second select user demographic drop-down box 215, a begin streaming control 218 and/or any other information or component that would relate to the selection and requesting of media item content 151.

The media item image 203 is an image of the media item that is selected for streaming. The change user control 206 may be selected to change the identification of the primary user. For example, if the primary user is not "John" as currently listed, a user may select the change user control 206. Upon selection of the change user control 206, the user may be requested to input a user login that may be used to identify the appropriate primary user. While the change user control 206 is depicted as a button, it is understood that the change user control 206 may comprise a text input filed, a text area, a drop-down box and/or any other components.

The associated user check-box 209 illustrates a check-box component that a user may select when the associated user corresponding to the associated user check-box 209 will be consuming the media item content 151 on the client device 106 with the primary user. As illustrated in the example in FIG. 2, the stream media selection view 200 may show multiple associated users that each have a corresponding associated user check-box 209. Although depicted as a check-box, it is understood that the associated user check-box 209 may comprise a text input fields, a text area, a drop-down box, a set of radio buttons, and/or any other input components.

The first select secondary user demographic drop-down box 212 illustrates a drop-down box that may be selected to select various characteristic or demographic data that may help identify a secondary user that is not known as an associated user. The first select secondary user demographic drop-down box 212 as illustrated in FIG. 2 allows a user to select the sex of the secondary user. Although depicted as a drop-down box, it is understood that the first select secondary user demographic drop-down box 212 may comprise a text input field, a text area, a set of radio buttons, a check-box, and/or any other components.

The first select secondary user demographic drop-down box 212 illustrates a drop-down box that may be selected to select various characteristic or demographic data that may help identify a secondary user that is not known as an associated user. The first select secondary user demographic drop-down box 212 as illustrated in FIG. 2 allows a user to select the sex of the secondary user. Although depicted as a drop-down box, it is understood that the first select secondary user demographic drop-down box 212 may comprise a text input field, a text area, a set of radio buttons, a check-box, and/or any other components.

The begin streaming control 218 illustrates a control that when selected begins streaming the requested media item content 151 to the user interface 163 rendered on the client device 106.

Figure 3:
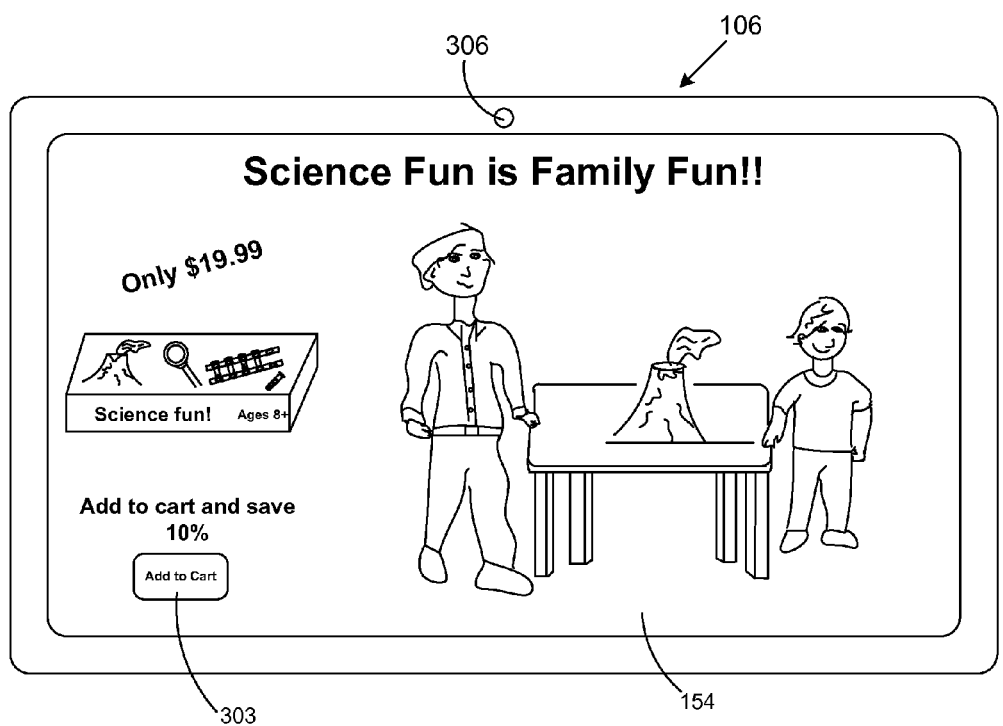

Turning now to FIG. 3, shown is drawing of an example of a user interface 163 rendered by a client 106 (FIG. 1) according to various embodiments of the present disclosure. In particular, FIG. 3 depicts an example of advertisement content 154 transmitted to the user interface 163 rendered by the client device 106. The client device 106 in FIG. 3 includes a camera 306 that may be used to capture an image that may be applied to facial recognition algorithms to identify users consuming media item content 151 and/or any items in the location of the client device 106. The advertisement content 154 may include an interactive control 303 that may be selected by a user. Upon selection of the interactive control 303, the media streaming application may serve up a network page with additional information about the product in the advertisement and/or facilitate the purchase or saving of the product.

In the advertisement content 154 depicted in FIG. 3, shown is an advertisement for a science kit with a father and son demonstrating the use. This is an advertisement that may be selected if the presence metadata 134 state that one of the users is a boy within the age range of eight to thirteen years old. Additionally, if the presence metadata 134 identifies that the primary user is the father of the secondary user, the advertisement may be selected because it depicts a father and son interacting. Therefore, the users identify more with the advertisement content 154 depicted in FIG. 3. Although the interactive control 303 depicted in FIG. 3 is depicted as a button, it is understood that the interactive control 303 may include a link and/or any other interactive component.

Figure 4:
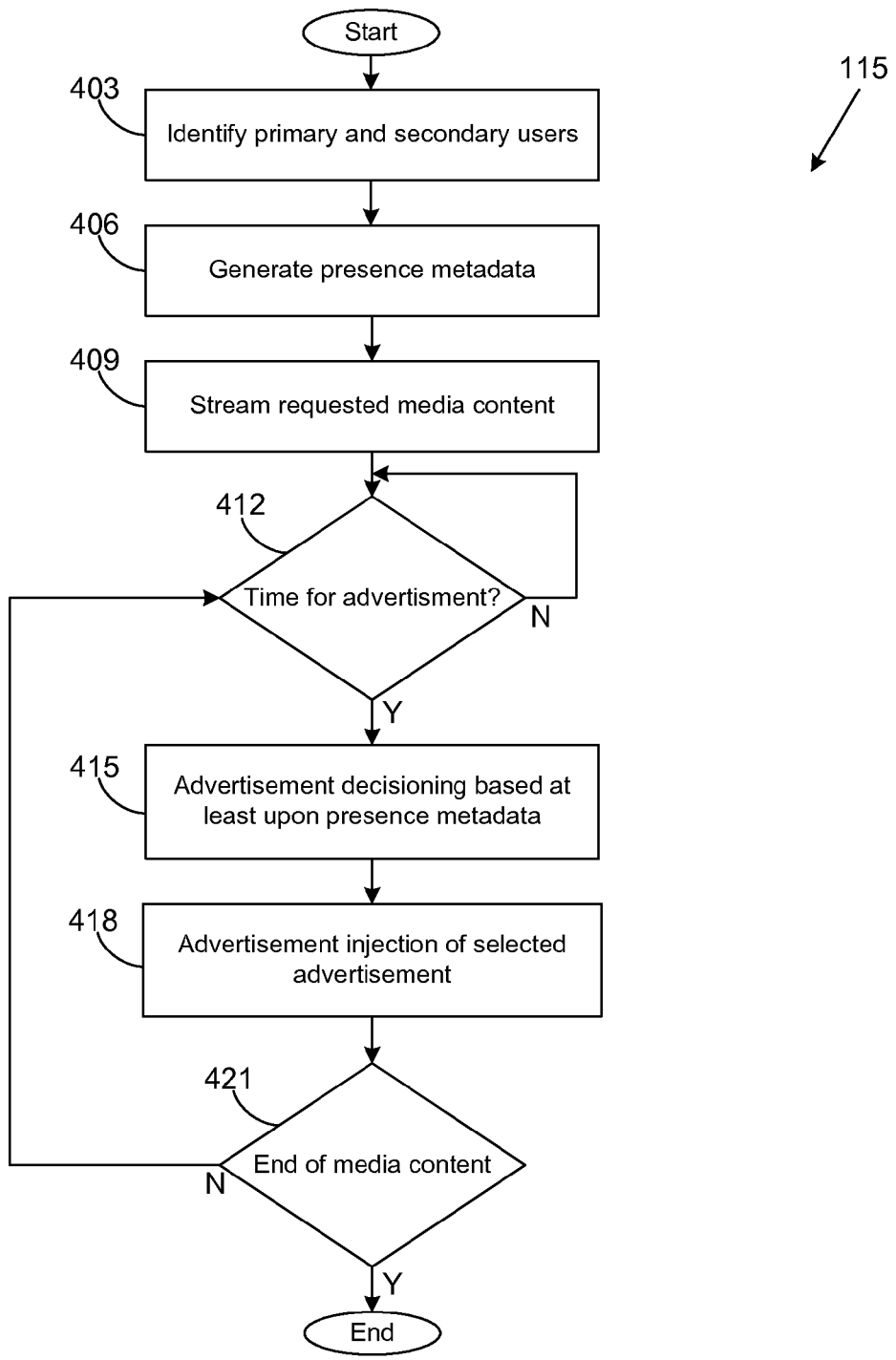
FIG. 4 is a flowchart illustrating one example of functionality implemented as portions of the media streaming application executed in a computing environment in the networked environment of FIG. 1 according to various embodiments of the present disclosure.

Moving on to FIG. 4, shown is a flowchart that provides one example of the operation of a portion of the media streaming application 115 according to various embodiments. It is understood that the flowchart of FIG. 4 provides merely an example of the many different types of functional arrangements that may be employed to implement the operation of the portion of the media streaming application 115 as described herein. As an alternative, the flowchart of FIG. 4 may be viewed as depicting an example of steps of a method implemented in the computing environment 103 (FIG. 1) according to one or more embodiments.

FIG. 4 provides a non-limiting example of the functionality that may be performed by the media streaming application 115 when facilitating the request and streaming of media item content 151 (FIG. 1) to a client device 106 (FIG. 1). Additionally, FIG. 4 demonstrates how the media streaming application 115 may invoke the advertisement selector service 117 (FIG. 1), the user identification service 119 (FIG. 1), and the media item streaming service 121 (FIG. 1) in order to transmit the media item content 151 as well as any selected advertisement content 154 (FIG. 1) that is selected at least in part upon the identification of the primary user and, if applicable, any secondary users.

Beginning with box 403, the media streaming application 115 invokes the user identification service 119 to identify the primary user and if applicable, any secondary users associated with the consumption of media item content. The user identification service 119 may identify the users by user login, user inputs, facial recognition algorithms applied to a received image, biometric algorithms based on received biometric inputs, RFID, and/or any other type of identification approach. In one non-limiting example, the identification of the primary user may be based at least in part upon a user login. The user login may include identification information such as, for example, a user name, a user password, an email address, account information and/or any other identifier that is related to the user. The primary user may also be identified may any other identification approach.

In another non-limiting example, the identification of the secondary users may be based at least in part upon a user input. For example, the media streaming application 115 may serve up a network page or other network content that may be able to present a user with a selection of associated users that are known to be associated with the primary user based upon the associated user data 142 (FIG. 1) as demonstrated by example in FIG. 2. In another non-limiting example, the network page may also include text entry boxes or other components that may allow a user to select information about the secondary users. For example, if user 1, user 2, and user 3 are all consuming a television show on a client device (106) and user 1 is identified as the primary user, the network page served up by the media streaming application 115 may include drop boxes that allow a user to select information about user 2 and user 3. As such, the user may select that user 2 is a female within the age range of twenty to twenty-five years old and user 3 is a male within the age range of five years old. Upon receipt of the user inputs, the user identification service 119 may be able to identify the secondary users. Though the identification of the secondary users may be specific to a particular user, the identification may also merely be that a user has particular characteristics, interests, demographics and/or other qualities that relate to the secondary users.

In another non-limiting example, the user identification service 119 may receive an image captured from the camera of the client device 106 and apply facial recognition algorithms to identify the secondary users. In another non-limiting example, the user identification service 119 may receive biometric data received from the client device 106 and apply biometric algorithms to identify the secondary users. For example, if the client 106 includes a microphone device, the client 106 may be able to capture voice signals from the users in the location of the client device 106. Upon receipt, the user identification service 119 may apply biometric algorithms and at least detect information about the users in the location based upon various frequencies associated with the signal. For example, the user identification service 119 may detect young children based upon the higher frequencies within the received signal.

In box 406, the media streaming application 115 invokes the advertisement selector service 117 to generate the presence metadata 134 based at least in part upon the identification of the primary user and if applicable, any secondary users associated with the consumption of the streaming media item content 151. The presence metadata 134 generated may be based at least in part upon demographic data corresponding to the primary user and/or any identified secondary users, interaction history 139 associated with the primary user and/or any identified secondary users, data related to items observed in the location of the client device 106, and/or any other data associated with the primary user and/or any secondary users.

For example, assume that the primary user is user 1 who is a male, aged forty years old. User 1 is consuming a football game on a client device 106 with user 2 and user 3, who are both males aged four years old. The presence metadata 134 may include information about not only user 1, but also user 2 and user 3. Therefore, the presence metadata 134 would include data that secondary users at the young age of four years old are also consuming the football game with user 1. Additionally, the presence metadata 134 may include that all males are consuming the football game. This presence metadata 134 may be used by the advertisement selector service 117 to select appropriate advertisement content 154 to transmit to the client 106 when appropriate.

In box 409, the media streaming application 115 may invoke the media item streaming service 121 to initiates the transmission of the requested media item content 151 to a portion of the user interface 163 rendered on the client 106 (FIG. 1). For example, the media streaming application 115 may receive a request by a user to streaming preferred media item content 151 to the client 106. Based on that request, the media item streaming service 121 obtains the requested media item content 151 from the media item library 130 and initiates the transmission of the media item content 151 to the client device 106.

In box 412, the media streaming application 115 via the media item streaming service 121 determines whether it is appropriate for an advertisement during the transmission of the media item content 151. For example, the media item content 151 may include an advertisement pod that notifies the media item streaming service 121 that an advertisement may be transmitted to the client 106. If it is determined that it is an appropriate moment for an advertisement, the media streaming application 115 proceeds to box 415. Otherwise, the media streaming application 115 continues to wait for an appropriate time for an advertisement at box 412.

In box 415, the media streaming application 115 invokes the advertisement selector service 117 to select advertisement content 154 based at least in part upon the generated presence metadata 134. The advertisement selector service 117 may invoke advertisement decisioning by comparing the advertisement metadata included in the advertisement data 145 that is associated with each advertisement included in the advertisement library 127 with the presence metadata 134 to determine which advertisements would be appropriate to transmit to the client 106. Since the presence metadata 134 includes data that may be about both the primary user and any secondary users, the advertisement selector service 117 may select advertisements to target the primary user and any of the secondary users, either individually or collectively. Additionally, the advertisement selector service 117 may be able to eliminate some advertisements that would be appropriate for the primary user but not the secondary users based on the advertisement data 145.

In one non-limiting example, the advertisement selector service 117 may assign scores to each or some of the advertisements within the advertisement library 127. The scores may be based at least in part upon the comparison of the presence metadata 134 and the associated advertisement metadata. Therefore, the higher the score, for example, the better the advertisement would be to present to the primary user and, if applicable, any secondary users.

In box 418, the media streaming application 115 invokes the media item streaming service 121 to invoke the advertisement injection of the selected advertisement content 154 to a portion of the user interface 163 rendered on the client 106. The media item streaming service 121 may pause the transmission of the media item content 151 to transmit the advertisement content 154. In another non-limiting example, the media item streaming service 121 may transmit the advertisement content 154 along with the media item content 151. However, the media item content 151 and the advertisement content 154 may be on separate portions of the user interface 163 rendered on the client 106.

In box 421, the media streaming application 115 determines via the media item streaming service 121 whether the streaming of the media item content 151 is complete. For example, if the television episode has ended or a user has requested to end the transmission. If the streaming of the media item content 151 has not ended, the media streaming application 115 proceeds back to box 412. Otherwise, the portion of the media streaming application 115 ends.

Figure 5:
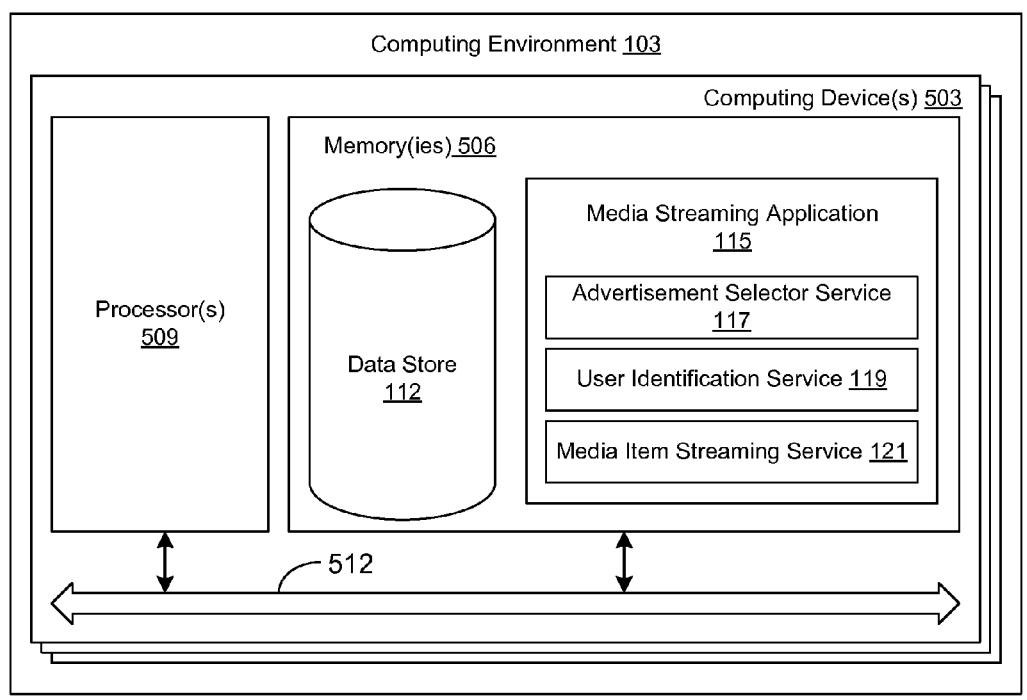
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 503. Each computing device 503 includes at least one processor circuit, for example, having a processor 509 and a memory 506, both of which are coupled to a local interface 512. To this end, each computing device 503 may comprise, for example, at least one server computer or like device. The local interface 512 may comprise, for example, a data bus with an accompanying address/control bus or other bus structure as can be appreciated.

Stored in the memory 506 are both data and several components that are executable by the processor 509. In particular, stored in the memory 506 and executable by the processor 509 are the media streaming application 115, the advertisement selector service 117, the user identification service 119, media item streaming service 121, and potentially other applications. Also stored in the memory 506 may be a data store 112 and other data. In addition, an operating system may be stored in the memory 506 and executable by the processor 509.

It is understood that there may be other applications that are stored in the memory 506 and are executable by the processor 509 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 509. In this respect, the term "executable" means a program file that is in a form that can ultimately be run by the processor 509. Examples of executable programs may be, for example, a compiled program that can be translated into machine code in a format that can be loaded into a random access portion of the memory 506 and run by the processor 509, source code that may be expressed in proper format such as object code that is capable of being loaded into a random access portion of the memory 506 and executed by the processor 509, or source code that may be interpreted by another executable program to generate instructions in a random access portion of the memory 506 to be executed by the processor 509, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 509 may represent multiple processors 509 and/or multiple processor cores and the memory 506 may represent multiple memories 506 that operate in parallel processing circuits, respectively. In such a case, the local interface 512 may be an appropriate network that facilitates communication between any two of the multiple processors 509, between any processor 509 and any of the memories 506, or between any two of the memories 506, etc. The local interface 512 may comprise additional systems designed to coordinate this communication, including, for example, performing load balancing. The processor 509 may be of electrical or of some other available construction.

Although the media streaming application 115, the advertisement selector service 117, the user identification service 119, the media item streaming service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the media streaming application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 509 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media streaming application 115, the advertisement selector service 117, the user identification service 119, and the media item streaming service 121, that comprises software or code can be embodied in any non-transitory computer-readable medium for use by or in connection with an instruction execution system such as, for example, a processor 509 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to at least:
receive a request to transmit a media content stream to a client device, the media content stream including an advertisement pod;
identify a primary user and a secondary user in association with a consumption of the media content stream, the primary user associated with a user account;
select a first subset of user information associated with the primary user and a second subset of user information associated with the secondary user based at least in part on demographic data associated with the secondary user, wherein selection of the first subset of user information comprises selecting specific user information associated with the primary user that is age-appropriate with respect to the demographic data associated with the secondary user;
generate presence metadata based at least in part on the first subset of user information associated with the primary user and the second subset of user information associated with the secondary user;
rank a plurality of advertisements based at least in part on the presence metadata, the media content stream, and advertisement compatibility metadata, the advertisement compatibility metadata including information about media content subject matter that is incompatible with individual ones of the plurality of advertisements;
select a highest ranked advertisement from the plurality of advertisements to transmit during a transmission of the media content stream to the client device;
transmit the highest ranked advertisement to the client device upon detection of the advertisement pod in the media content stream;
generate network content comprising additional information about an item associated with the highest ranked advertisement in response to receiving a request from the client device via a selection of a link included in the highest ranked advertisement;
transmit the network content to the client device; and
facilitate an online transaction of the item associated with the highest ranked advertisement in response to receiving a transaction request for the online transaction from the client device.

2. The non-transitory computer-readable medium of claim 1, wherein the presence metadata is further based at least upon at least one of an interaction history of the primary user, an interaction history of the secondary user, or demographic data associated with the primary user.

3. A method, comprising:
receiving, by at least one computing device, a request to transmit media content to a client device, the media content including an advertisement pod;
identifying, by the at least one computing device, a primary user and a secondary user in association with a consumption of the media content on the client device, the primary user associated with a user account;
selecting, by the at least one computing device, a first portion of user information associated with the primary user and a second portion of user information associated with the secondary user based at least in part on an age range associated with the secondary user, wherein selection of the first portion of the user information associated with the primary user comprises selecting specific user information that is appropriate with respect to the age range associated with the secondary user;
generating, by the at least one computing device, presence metadata based at least in part on the first portion of the user information associated with the primary user and the second portion of the user information associated with the secondary user;
ranking, by the at least one computing device, a plurality of advertisements based at least in part on the presence metadata, the media content, and advertisement compatibility metadata, the advertisement compatibility metadata including information about media content subject matter that is incompatible with individual ones of the plurality of advertisements;
selecting, by the at least one computing device, a highest ranked advertisement from the plurality of advertisements to transmit during a transmission of the media content to the client device;

transmitting, by the at least one computing device, the highest ranked advertisement to the client device;

generating, by the at least one computing device, network content comprising additional information about an item associated with the highest ranked advertisement in response to receiving a request from the client device via a selection of a link included in the highest ranked advertisement;

transmitting, by the at least one computing device, the network content to the client device; and facilitating, by the at least one computing device, an online transaction of the item associated with the highest ranked advertisement in response to receiving a request for the online transaction from the client device.

4. The method of claim 3, wherein selecting the first portion of the user information associated with the primary user and the second portion of the user information associated with the secondary user is further based at least in part upon at least one of the following: demographic data associated with the primary user, demographic data associated with the secondary user, or an interaction history of the secondary user.

5. The method of claim 4, wherein identifying the primary user is based at least in part upon at least one of the following: at least one user input, facial recognition, or biometrics.

6. The method of claim 4, wherein the client device includes a camera, and identifying the secondary user is based at least in part upon a facial recognition algorithm using an image captured by the camera of the client device.

7. The method of claim 3, wherein the client device includes a microphone device, and identifying the secondary user is based at least upon the audio signal captured by the microphone device.

8. The method of claim 3, wherein ranking the plurality of advertisements is further based at least in part upon a relationship between the primary user and the secondary user.

9. The method of claim 3, further comprising:
detecting, by the at least one computing device, an addition of a new secondary user or a departure of the secondary user;
identifying, by the at least one computing device, the new secondary user when the addition of the new secondary user is detected; and
generating, by the at least one computing device, the presence metadata when the new secondary user is detected or the secondary user has departed.

10. The method of claim 3, further comprising:
identifying, by the at least one computing device, at least one second item in an area associated with the consumption of the media content; and
wherein ranking the plurality of advertisements is further based at least in part on the at least one second item.

11. The non-transitory computer-readable medium of claim 1, wherein, when executed, the program further causes the at least one computing device to at least determine an age range of at least one of the primary user or the secondary user based at least in part on a frequency of an audio signal received from the client device.

12. The method of claim 3, wherein the age range is based at least in part on an audio signal.

13. A system, comprising:
at least one computing device comprising a processor and a memory; and
at least one application stored in the memory and executable in the at least one computing device, wherein, when executed, the at least one application causes the at least one computing device to at least:

receive a request to transmit a media content stream to a client device, the media content stream including an advertisement pod;

identify a primary user and a secondary user in association with a consumption of the media content stream, the primary user associated with a user account;

select a first subset of user information associated with the primary user and a second subset of user information associated with the secondary user based at least in part on demographic data associated with the secondary user, wherein selection of the first subset of user information comprises selecting specific user information associated with the primary user that is age-appropriate with respect to the demographic data associated with the secondary user;

generate presence metadata based at least in part on the first subset of user information associated with the primary user and the second subset of user information associated with the secondary user;

rank a plurality of advertisements based at least in part on the presence metadata, the media content stream, and advertisement compatibility metadata, the advertisement compatibility metadata including information about media content subject matter that is incompatible with individual ones of the plurality of advertisements;

select a highest ranked advertisement from the plurality of advertisements to transmit during a transmission of the media content stream to the client device;

transmit the highest ranked advertisement to the client device upon detection of the advertisement pod in the media content stream;

generate network content comprising additional information about an item associated with the highest ranked advertisement in response to receiving a request from the client device via a selection of a link included in the highest ranked advertisement;

transmit the network content to the client device; and facilitate an online transaction of the item associated with the highest ranked advertisement in response to receiving a transaction request for the online transaction from the client device.

14. The system of claim 13, wherein the presence metadata is further based at least in part upon at least one of the following: an interaction history of the primary user, an interaction history of the secondary user, or demographic data associated with the primary user.

15. The system of claim 13, wherein selecting the first subset of user information associated with the primary user and the second subset of user information associated with the secondary user is further based at least in part on at least one of the following: demographic data associated with the primary user, an interaction history of the primary user, or an interaction history of the secondary user.

16. The system of claim 13, wherein identifying the primary user is based at least in part upon at least one of the following: a user input, facial recognition, or a biometric.

17. The system of claim 13, wherein identifying the secondary user is based at least in part upon at least one of the following: a user input, facial recognition, or a biometric.

18. The system of claim 13, wherein ranking the plurality of advertisements is further based at least in part upon a relationship between the primary user and the secondary user.

19. The system of claim 13, wherein, when executed, the at least one application further causes the at least one computing device to at least:
detect an addition of a new secondary user;

identify the new secondary user; and update the presence metadata in response to identifying the new secondary user.

20. The system of claim 13, wherein, when executed, the at least one application further causes the at least one computing device to at least identify at least one second item in an area associated with the consumption of the media content stream, wherein ranking the plurality of advertisements is further based at least in part on the at least one second item.

21. The non-transitory computer-readable medium of claim 1, wherein, when executed, the program further causes the at least one computing device to at least:

detect an absence of the secondary user;

detect an addition of a new secondary user; and update the presence metadata in response to detection of the new secondary user.

* * * * *

UNITED STATES PATENT AND TRADEMARK OFFICE
CERTIFICATE OF CORRECTION

| | | |
|---|---|---|
| PATENT NO. | : 9,332,284 B1 | Page 1 of 1 |
| APPLICATION NO. | : 13/780251 | |
| DATED | : May 3, 2016 | |
| INVENTOR(S) | : Amber Autrey Taylor | |

It is certified that error appears in the above-identified patent and that said Letters Patent is hereby corrected as shown below:

On the title page, item 57 - ABSTRACT

Line 5 of the Abstract, delete "streaming" and insert --streamed--.

Signed and Sealed this
Twenty-first Day of June, 2016

Michelle K. Lee
*Director of the United States Patent and Trademark Office*